United States Patent
Hawle

[11] 3,762,743
[45] Oct. 2, 1973

[54] PIPE DRILL CLIP

[76] Inventor: Erwin Hawle, Wagrainerstrasse 13, Vocklabruck, Austria

[22] Filed: Dec. 4, 1972

[21] Appl. No.: 311,785

[30] Foreign Application Priority Data
Dec. 23, 1971 Austria.................................. 11061

[52] U.S. Cl...................... 285/197, 24/269, 24/279, 24/280
[51] Int. Cl............................................. F16l 41/00
[58] Field of Search................... 285/197, 198, 199; 24/269, 279, 280, 286, 285, 284

[56] References Cited
UNITED STATES PATENTS

| | | | |
|---|---|---|---|
| 3,687,490 | 8/1972 | Dunmire | 285/197 |
| 3,663,042 | 5/1972 | Fowler | 285/199 |
| 1,484,469 | 2/1924 | Brucelarie | 285/197 X |
| 351,397 | 10/1886 | Payne | 285/197 X |
| 1,479,679 | 1/1924 | Sandholm | 24/280 X |
| 2,278,714 | 4/1942 | Stauffer | 24/279 X |

FOREIGN PATENTS OR APPLICATIONS

| | | | |
|---|---|---|---|
| 697,419 | 11/1964 | Canada | 24/286 |
| 39,846 | 12/1931 | France | 285/198 |
| 646,131 | 7/1928 | France | 285/199 |

Primary Examiner—Thomas F. Callaghan
Attorney—Kurt Kelman

[57] ABSTRACT

A saddle member has an axial through bore and is adapted to be applied to a portion of the periphery of a pipe to be drilled. The saddle member is provided on opposite ends with abutments. A clamping band is adapted to embrace another portion of the periphery of said pipe and has two end portions, each of which has a central longitudinal recess and two side strips on opposite sides of said recess. Bearing members bear on said abutments on the side of the saddle member remote from said clamping band. Bolts extend through said bearing members and said abutments and having each a head, which is disposed on the side of said bearing member remote from said abutment and engageable to rotate said bolt, and a screw-threaded shank disposed on the side of said saddle member facing said clamping band. Tightening nuts are threaded on said shanks and comprise each two diametrically opposite, laterally protruding pins, each of which is formed with a slot. Each of said side strips is wound on one of said pins and extends into the slot thereof.

1 Claim, 4 Drawing Figures

PATENTED OCT 2 1973  3,762,743

PIPE DRILL CLIP

This invention relates to a pipe drill clip which comprises a saddle member having a central through bore, a U-shaped clamping member, which is adapted to embrace the pipe to be drilled and is provided at both ends with threaded bolts, bearing members fitted on said bolts and adapted to be inserted in abutments of the saddle member, and tightening nuts threaded on said bolts.

These pipe drill clips are used when it is desired to drill bores in pipes and to screw branch conduits into such bores. The saddle member should be forced against the main pipe as tightly as possible. This purpose is served by the provision of a suitable gasket between the pipe and the saddle member and in that the clamping member forces the saddle member against the pipe.

It is desired to provide pipe drill clips which are not only suitable for pipes of a given size but are more economical in that they can be used on pipes which have diameters in a certain range. For this purpose, the gasket provided in the saddle member must be concave toward the pipe so that they can well conform to different curvatures of the pipe, within certain limits. Besides, the clamping members should wrap the pipe over an angle which is as large as possible, in order to minimize the pressure per unit of area; they should be hinged to the saddle member, and the length of the clamping members should be variable in adaptation to pipes having different peripheral dimensions. The hinges between the saddle member and the ends of the clamping member are provided in that the bearing members fitted on the threaded bolts at the ends of the clamping member are cylindrical and the saddle members form suitable abutments for these bearing members. When the tightening nuts are tightened to tighten the clamping member, the ends of the clamping member owing to their hinge joint will assume an optimum position so that the clamping member wraps the pipe over an angle which is as large as possible and the clamping force exerted by the clamping member on the saddle member is optimally transmitted from the bearing members to the abutments.

These joints between the clamping member and the saddle member have proved satisfactory. On the other hand, these previously disclosed pipe drill clips have the disadvantage that the length of the clamping member cannot be sufficiently adjusted to the peripheral dimension of the pipe to be drilled. For an adjustment in length, only the screw threads of the threaded bolts at the ends of the clamping member can be utilized but this adjustment is utterly insufficient because the screw threads must be utilized to produce the required contact pressure between the clip and the pipe. This adjustment can be used in any case only for very slight changes in length, whereas a plurality of clamping members differing in length must be used with pipes which differ substantially in diameter.

It is an object of the present invention so to improve a pipe drill clip of the kind described first hereinbefore that these drawbacks are avoided and, above all, to provide the pipe drill clip with a clamping member which can be made in a simple manner and at low cost and which can be changed in length to any extent which may be desired in practice.

This object is essentially accomplished according to the invention in that the ends of the clamping member are provided with headed bolts, that the tightening nuts are provided with two mutually opposite, laterally protruding, slotted pins, and that the clamping member consists in a manner known per se of a band, the end portions of which have central recesses to form two side strips each and are wound on the pins of the tightening nuts whereas the end portions of the side strips extend in the slots of the pins. This joint between the clamping band and the bolts provided at the ends of the clamping band meets all requirements to be fulfilled. The end portions of the clamping band can be wound in a smaller or larger length on the pins of the tightening nuts so that the clamping band can be adjusted to pipes differing in diameter without difficulty and without need for a large structural expenditure. This is so because the free length of the clamping band will depend on the number of turns in which the clamping band has been wound on the pins so that this length can be varied virtually within any desired range. On the other hand, the axial extent of the threw threads of the headed bolts is entirely available for tightening of the clamping band so that the required contact pressure force is ensured. The clamping band wound about the pins can well hug the outside surface of the pipe because it is not rigidly connected to or guided by the tightening nuts but can follow any pivotal movement in the winding plane. Another advantage of the present clamping band resides in that it is simple and can be made at extremely low cost.

The invention is shown by way of example on the accompanying drawing, in which

Figure 1:
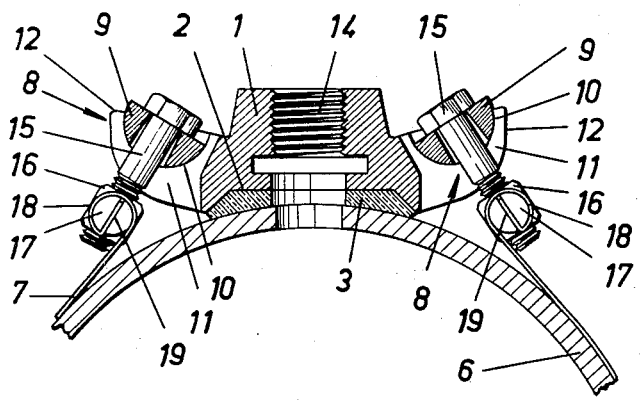
FIG. 1 is a longitudinal sectional view showing the pipe drill clip.
Figure 2:
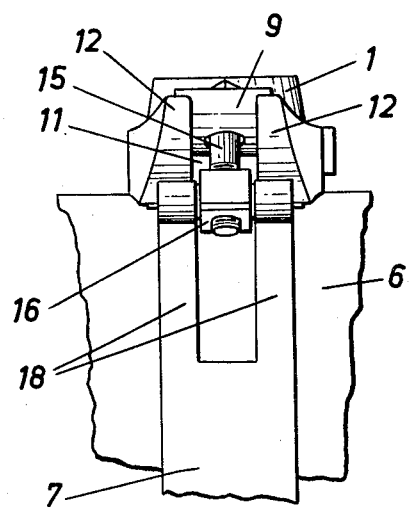
FIG. 2 is an elevation taken at right angles to the axis of the pipe.
Figure 3:
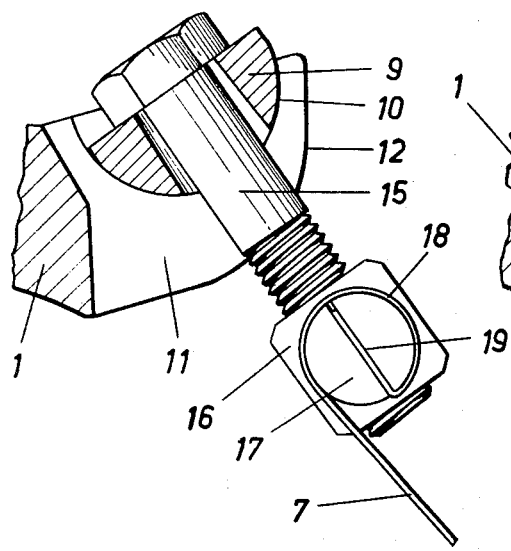
FIGS. 3 and 4 are enlarged views showing respective ends of a clamping member.
Figure 4:
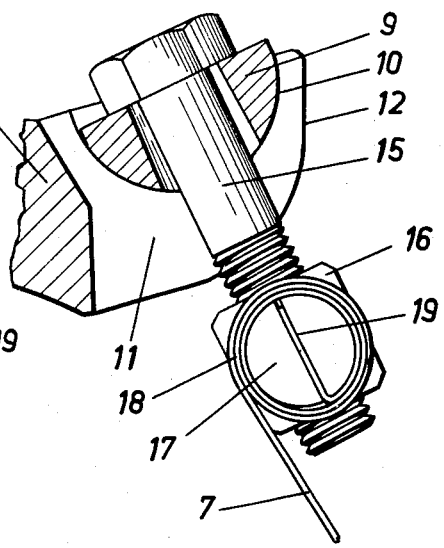

The saddle member 1 of the pipe drill clip is provided with a central bore 14 and has a planar sealing surface 2 and a gasket 3, which is concave toward the pipe 6. The saddle member 1 is forced against the pipe 6 by means of a clamping band 7, which at its ends 8 carries approximately hemicylindrical bearing members 9, which are adapted to be fitted into conforming abutments 10 formed on the saddle member 1. These abutments 10 extend parallel to the axis of the pipe. Adjacent to these abutments, the saddle member is formed with recesses 11, which permit of a pivotal movement of the ends 8 of the clamping band. In the embodiment shown by way of example on the drawing, the saddle member 1 terminates transversely to the longitudinal direction of the pipe in forked side portions 12, which constitute the abutments 10. The slots between the prongs 12 form the recesses 11. At its ends 8, the clamping band is provided with headed bolts 15, on which the bearing members 9 are fitted and tightening nuts 16 are threaded. Each tightening nut 16 has two mutually opposite, laterally protruding pins 17, which are slotted. The centrally recessed end portions of the clamping band having two side strips 18 each are wound on said pins. An unintended unwinding or withdrawing of the wound-up end portions of the clamping band from the pins 17 is prevented because the side strips 18 extend into the slots 19 of the pins 17. The number of turns wound on the pins 17 will determine the effective length of the clamping band. As is indicated in FIGS. 3 and 4, one and the same clamping band may be used to force the saddle member 1 against pipes differing in size because to adjust the clamping member 7 to a pipe having a given diameter it is sufficient to wind one or both end portions of the clamping member to a larger or smaller extent on the pins 17 of the tightening nut 16. The clamping band wound on the pins of the clamping nut can well hug the outside surface of the pipe because the joint provided according to the invention between the band and the tightening nuts 16 of the headed bolts 15 enables a pivotal movement of the band about the pins. Thus, in addition to enabling a variation of the clamping band in length within wide limits, the invention affords the advantage that the clamping band can wrap the pipe over a large angle so that the pressure applied to the pipe wall per unit of area remains within tolerable limits.

What is claimed is:

1. A pipe drill clip, which comprises
    a saddle member having an axial through bore and adapted to be applied to a portion of the periphery of a pipe to be drilled, said saddle member being provided on opposite ends with abutments,
    a clamping band adapted to embrace another portion of the periphery of said pipe and having two end portions, each of which has a central longitudinal recess and two side strips on opposite sides of said recess,
    bearing members bearing on said abutments on the side of said saddle member remote from said clamping band,
    bolts extending through said bearing members and said abutments and having each a head, which is disposed on the side of said bearing member remote from said abutment and engageable to rotate said bolt, and a screw-threaded shank disposed on the side of said saddle member facing said clamping band, and
    tightening nuts threaded on said shanks and comprising each two diametrically opposite, laterally protruding pins, each of which is formed with a slot,
    each of said side strips being wound on one of said pins and extending into the slot thereof.

* * * * *